United States Patent Office 3,480,778
Patented Nov. 25, 1969

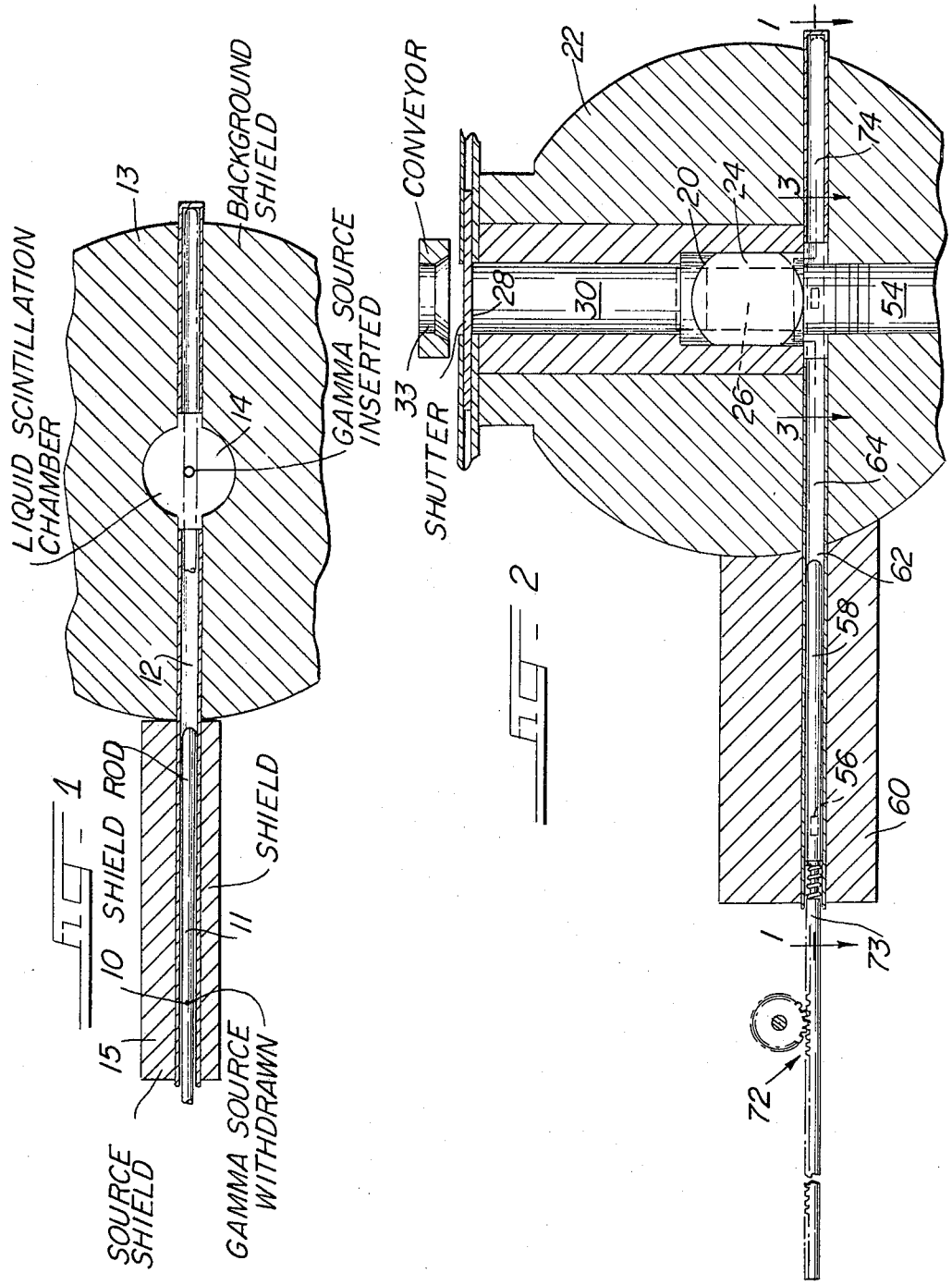

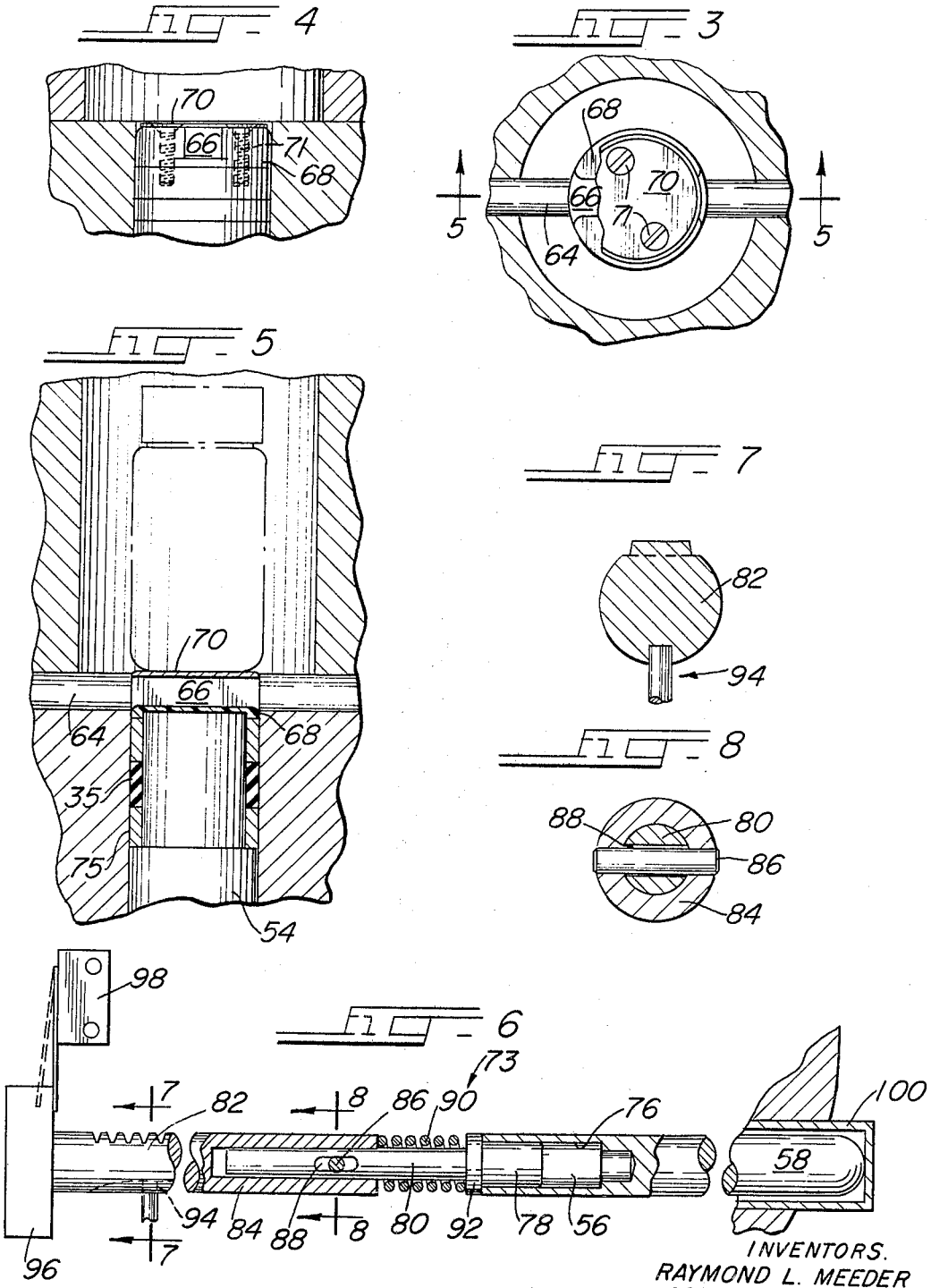

3,480,778
LIQUID SCINTILLATION SAMPLE
STANDARDIZATION APPARATUS
Raymond L. Meeder, Palos Heights, and Joseph E. Kus, Mount Prospect, Ill., assignors to Nuclear-Chicago Corporation, Des Plaines, Ill., a corporation of Delaware
Filed Apr. 11, 1966, Ser. No. 541,767
Int. Cl. G21h 5/00
U.S. Cl. 250—106                                8 Claims

ABSTRACT OF THE DISCLOSURE

Liquid scintillation or similar samples within a shield forming a counting chamber are selectively exposed to a standardizing source by reciprocation of the source through a source-transport passage. Samples are introduced by a holder movable through a sample-transport passage. The source is affixed to a forwardly extending elongated shielding member. When the standard source is inserted adjacent to a sample in the chamber, the forwardly-extending shielding member seats in a recess in the shield wall, and when the source is withdrawn, the forwardly extending portion of the shielding member shields the chamber from the source. Specific construction for the external standardization mechanism of an automatic liquid-scintillation counting system is described.

This invention relates to apparatus for liquid scintillation measurements of radioactivity, and more particularly to liquid scintillation apparatus wherein provision is made for selective employment of an auxiliary standard radioactivity source for indication of counting efficiency and analogous purposes.

It is well known that measurements of substances dispersed in a liquid scintillation composition are subject to inaccuracy stemming from inability to control the degree of "quenching" of the scintillation process from sample to sample, thus making some form of standardization desirable where highly accurate measurements are required. Various methods of standardization are in use. One method which offers advantages in certain types of measurements is called "external standardization." In this method, there is employed externally of the sample vial a standard radiation source, normally of gamma rays, and the response of the scintillating liquid to this known source is measured (usually in a separate measurement after the main measurement is completed) and the efficiency or error of the measurement on the unknown activity within the bottle or vial is deduced. In the copending application of Richard B. Frank, Ser. No. 541,644, filed concurrently herewith on Apr. 11, 1966 there is described and claimed an improvement in this method as regards placement of the source with respect to the sample vial. For reasons therein discussed, it is found highly advantageous to place the source immediately beneath the center of the bottom of the vial.

The present invention lies in structure for utilizing the method of external standardization, particularly in the improved form discussed in the copending application mentioned, in automatic liquid scintillation counting equipment, and particularly equipment of the type now in common use, wherein the samples are supported in the counting chamber on the upper end of an elevator or ram, which is vertically reciprocated between that position and an upper position for transporting samples to and from the shielded counting chamber through the vertical sample-transport passage in the shield.

It is necessary that an external standardization system provide a very high degree of shielding of the counting chamber from the external standard source when the latter is withdrawn. As is well known, such devices are frequently used for highly sensitive measurements, and every effort is made to reduce background counts in the chamber due to external radiation. The thick shields which characterize such equipment are of course for this purpose, the background admitted through the sample-transport passage being negligible. Prevention of background rise due to the external standardization source is of particular importance because of the fact that this auxiliary is normally incorporated in equipment designed for measurement of very weak samples, since correction on samples of high counting rate can normally be made more easily by other methods not here relevant. To solve the problem of preventing leakage from the source to the counting region when the source is in the stored condition, the source transport mechanisms heretofore devised have made relatively complex provisions. In the earliest reported use of the method (Higashimura, International Journal of Applied Radiation and Isotopes, 1962, volume 13, page 308), the main shield was opened upon each insertion and removal of the standard source. Various other provisions have been made in automatic equipment, such as moving the source along a complex path by a pneumatic system.

In addition to the matter of prevention of leakage of radiation from the stored source to the counting chamber which exists in any case, the specification of the use position of the source as being within the top portion of the elevator adds further problems to the handling mechanism.

The present invention provides an extremely simple manner of moving the source between stored and use positions while maintaining the desired freedom from production of background. At the same time, the invention provides extremely reliable positioning of the source with respect to the sample under measurement.

Both the general and the specific features of construction taught by the invention will best be understood from consideration of the embodiment illustrated in the drawing, in which:

FIGURE 1 is a more or less schematic horizontal sectional view of a shielded scintillation counting chamber with an associated standardization source movable between storage and use positions;

FIGURE 2 is a vertical sectional view of a liquid scintillation counting chamber and associated mechanism for insertion and removal of an external standardization source;

FIGURE 3 is an enlarged fragmentary horizontal sectional view taken along the line 3—3 of FIGURE 2, with the top portion of an elevator structure shown therein partially broken away for clarity of illustration;

FIGURE 4 is a side elevational view of the upper portion of the elevator;

FIGURE 5 is a vertical sectional view taken along the line 5—5 of FIGURE 3;

FIGURE 6 is a detailed view corresponding to a portion of FIGURE 2, partially in elevation and partially broken away in section, showing details of construction of segments of an elongated assembly incorporating the standard source, the assembly being shown in the withdrawn position in FIGURE 2, but in the inserted position in FIGURE 6;

FIGURE 7 is a sectional view taken along the line 7—7 of FIGURE 6 illustrating a detail of construction; and FIGURE 8 is a further detailed sectional view taken along the line 8—8 of FIGURE 6 illustrating a further detail of construction.

The general principle of operation of the present source-insertion construction is shown in FIGURE 1. As there schematically shown, the standardization source 10 is incorporated in an elongated shield rod 11 which reciprocates in a straight aperture 12 extending diametrically across the shield 13 which encloses the central liquid scintillation chamber 14 in which samples are counted. The withdrawn and inserted positions of the source are shown in solid and dotted representation, respectively, in FIGURE 1.

In the withdrawn position, the source 10 is encased in an auxiliary shield 15 with an aperture in line with the aperture 12. In the stored position, the source is shielded from the chamber by a long length of shielding material, the attenuation in this direction being equivalent to that which would be obtained if the main shield had no aperture.

In the inserted condition, the source 10 is positioned in the counting chamber to expose a sample there to the known amount of radiation. With straight motion of the assembly bearing the source, the shield rod portion which precedes the source is seated in the opposite or far side of the aperture 12. With the length of shield rod required to make the shielding in the withdrawn position equivalent to that provided by an inviolate main shield, the recess in the main shield which accommodates this portion in the inserted position is of the same order as the thickness of the shield. However, for the same reasons as those which permit a straight access aperture for sample-transport, this recess or aperture in the shield on the side opposite the storage position of the source does not interfere with sensitive counting, the probability of entrance of randomly-directed background radiation being negligible.

It will be seen that this simple linear motion of the source and its associated shield rod provide the same performance or function as is produced by much more complex manners of dealing with the problem of storing and moving the standard source, and the broader aspects of the invention, illustrated in FIGURE 1, may be employed in a variety of forms. However, the invention further provides particular structural features for most advantageous utilization of the principle of operation generaly illustrated in FIGURE 1, particularly where the source location is beneath the sample vial, and FIGURES 2 through 8 show the invention in its most advantageous form.

FIGURE 2 shows the invention as applied to a liquid scintillation counting apparatus of a type having general features of construction heretofore disclosed in U.S. Patent 3,163,756 of the same inventors, which has been in common use for a number of years. Details of construction and operation of the illustrated equipment, other than the portion to which the present invention relates, are omitted from the present illustration and drawing, the manner in which the various portions are driven and cycled in counting of samples being now well known, and in any event sufficiently described in the patent just mentioned. For present purposes, it will be adequate to describe merely the fundamental aspects of construction and operation of this portion of the apparatus.

The counting chamber 20 is heavily shielded by a generally spherical shield 22. Photomultipliers 24 on opposite sides of the chamber serve as transducers for the scintillations occurring in the sample vial or bottle 26. A shutter 28 excludes the entry of light through a vertical passage 30 employed for introduction and removal of sample vials. Each sample is disposed on the top end of an elevator or ram 54. A conveyor 33 slides successive samples onto the elevator when the latter is in the raised position (not shown), each being then lowered into the counting chamber. One or more resilient rings 35 on the periphery of the top of the elevator form a light seal in the aperture 30 when the elevator is in the partially raised position, and this seal prevents the entry of light into the chamber during the time that the shutter 28 is opened in the changing of samples.

In modifying the counting apparatus described above for external standardization in the manner taught in the copending application earlier mentioned, the source 56 is attached to the back end of a shield rod 58, which is preferably of metal of suitable gamma attenuation, but of better mechanical characteristics than lead. A suitable material is the tungsten, copper, and nickel alloy commercially sold as Fansteel alloy 77. In the withdrawn position (illustrated) the assembly of the source and shield rod is seating in an auxiliary shield 60, having a straight central aperture 62 aligned with the aperture 64 in the main shield 22.

The elevator 54 has an opening 66 extending therethrough to pass the shield rod 58. The opening 66 is formed by a groove of rectangular shape across the top of a cap 68 secured to the top end of the elevator 54. A thin cover 70 is secured to this assembly by the same screws 71 which complete it and also clamp in place one or more sealing rings 35 and spacers 75 employed in making the light seal earlier mentioned.

The assembly of source 56 and shield rod 58 is driven by a rack and pinion drive at 72, secured to the shield rod 58 as later more fully described, forming an elongated reciprocable assembly having a withdrawn or storage position and an inserted or use position as earlier described in connection with FIGURE 1, the assembly 73 being of a length to extend from the drive at 72, through the apertures 62 and 64 in the shields, through the opening 66 in the elevator, and through the aperture 74 in the shield 22 on the opposite side of the elevator in the use position.

Details of construction of the overall assembly 73, and the manner in which it is positioned, are best seen in FIGURES 6 through 8. The forward end of the shield rod 58 is rounded to facilitate entrance into the opening 66. The rearward end of the shield rod 58 is formed with a bore or well 76, the bottom of which is appropriately shaped to receive the capsule containing the source 56 (only the capsule itself being visible in the drawing). The source is permanently secured in the rod, and the bore is capped by the butt end 78 of an elongated pin 80, which is thus secured to the shield rod 58. The elongated rack 82 has a tube or cup formed in the forward end thereof, slidingly receiving the pin 80, and a cross-pin 86 through this tube 84 is reciprocable in a slot 88 in the pin 80. A corresponding spring 90 encircles the intermediate portion of the pin 80, the ends of the spring 90 resting against the outer end of the tube portion 84 and a shoulder 92 on the butt end 78 of the pin. The compression spring 90 accordingly urges the rearward and forward portions of the assembly 73 apart, limited by the limit of motion of the pin 86 in the slot 88.

The rotational position of the assembly 73 is held fixed by keyway engagement at 94. The outermost end of the assembly 73 bears a switch-actuating collar 96 which operates a microswitch 98 at the inner extremity of motion and a similar microswitch (not shown) at the outer extremity of motion, to shut off the motor drive (not shown) of the pinion.

The limit of motion of the rod 58 when the source is in the use position is fixed by abutment against the outer end of a thimble 100 which is secured in the aperture portion 74 in the shield, preferably threaded (not shown) to permit factory adjustment of exact position of the source within the elevator.

In the stored condition, and during insertion and removal, the spring 90 holds the assembly 73 in its most elongated condition, as earlier mentioned. Exact positioning of the source is of course not critical in the withdrawn position. When the source is to be inserted, the drive is operated by suitable actuation of the motor, and the shield rod is driven inward. To produce exact positioning of the source with respect to the sample vial supported by the plate 70, the dimensioning of the aligned openings 64, 66 and 74 should be chosen carefully. Because the critical point of location is the vertical orientation of the source in the elevator, the height of the opening 66 is closely dimensioned to the diameter of the rod 58. The other portions of the continuous straight aperture formed by the sequential passages are preferably of larger diameter than this dimension, and the width of the passage or opening 66 is likewise desirably made substantially larger than the height, so that the only close clearance of the rod and diameter exists in the critical dimension (sidewise variation of position of the source being relatively inconsequential, as pointed out in the copending application mentioned). In order to introduce no needless friction, the entrance to the opening 66 in the elevator is provided with tapered or rounded guide surfaces, and the rounded end of the rod 58 thus readily enters the opening and traverses the elevator despite any tiny variation in elevator position which may be introduced by such uncontrollable factors as temperature effects and the like. Typically, the rod may be exactly one-quarter inch in diameter, and the height clearance in the elevator may be of the order of 15 mils. With these dimensions, the width of the elevator opening and the diameters of the cooperating passages may be of the order of 0.3 inch, thus producing substantial clearance at all points but the critical spacing point. When such a dimensioning is used with a top plate 70 of 32 mil thickness, the source height is so adequately controlled that the counting rate produced by the standard source in a standard scintillating solution can be reproduced repeatedly over long periods of time without readily detectable change, i.e., without error production in the measurement despite the extremely simple mechanism involved in the source positioning. In addition to the close control of vertical distance from the vial given by the dimensioning of the openings, the sliding connection of the pins 80 and 86, already described, permits the horizontal position of the source 56 to be determined solely by bottoming of the rod 58 in the thimble 100 without requiring delicacy or constancy of the actuation of the shut-off switch 98, since the adjustment at the outer end of the assembly 73 need merely be within the precision limits set by the length of the slot 88, travel of the rack 82 beyond the point of proper positioning of the source in the elevator being absorbed by compression of the spring 90.

Many modifications of the teachings of the invention will readily be devised by persons skilled in the art. Accordingly, the scope of the patent protection afforded the invention should not be considered as limited by the particular embodiment herein illustrated and described, but should extend to all utilization of the structure of the invention as defined in the appended claims, and equivalents thereof.

What is claimed is:
1. In radiation-counting apparatus having:
   (a) a shield forming a radiation-measurement chamber adapted to receive successive samples and having a sample-transport passage adapted for insertion and removal of samples and a source-transport passage adapted for insertion and removal of a standard source,
   (b) a sample-holder movable through the sample-transport passage and having a sample-bearing portion positioning successive samples in the chamber and a source-receiving portion adjacent the sample-bearing portion, and
   (c) a standard source and means for selectively inserting and removing the standard source into and from the source-receiving portion for standardizing measurements on samples,
the improved construction characterized by:
   (d) the inserting and removing means comprising an elongated shielding member reciprocable through the source-transport passage and bearing the source, the shielding member extending substantially forwardly of the source when withdrawn,
   (e) the source-receiving portion of the sample-holder comprising an aperture extending transversely therethrough and registering with the source-transport passage when a sample is positioned for measurement, the shield having a recess opposite the source-transport passage receiving the shielding member when the source is inserted in the sample-holder,
   (f) the shielding member blocking inward leakage of radiation from the source through the source-transport passage when the source is withdrawn and blocking outward leakage of radiation from the source through said recess when the source is inserted.

2. The improved apparatus of claim 1 further characterized by the shielding member being a rigid rod and the source-transport passage, the recess and the sample-holder aperture forming a substantially straight continuous path.

3. The improved apparatus of claim 2 wherein the sample-holder is a vertically reciprocable elevator and the path of the source is horizontal.

4. The improved apparatus of claim 2 further characterized by the shielding member being attached at its outward end to an elongated straight drive rod of substantially the same cross-section forming a continuous substantially straight assembly having the source in an intermediate portion thereof, and having stationary auxiliary shielding means surrounding said intermediate portion in the withdrawn position and defining a passage registering with said source-transport passage.

5. The apparatus of claim 1 wherein the inserted position of the source is fixed by abutment of the end of the shielding member against the end of the recess in the shield.

6. The apparatus of claim 3 having substantially less difference between the vertical thickness of the shielding member and the vertical height of the aperture in the elevator than in any other portion of the path of the shielding member, the mouth of the aperture through which the rod enters the aperture guidingly mating with the end of the rod, so that the spacing between the source and the upper surface of the elevator is independent of small variations in height of the elevator.

7. The apparatus of claim 6 wherein the aperture in the elevator is formed by a body member having a transverse groove and a thin sample-supporting element bridging across the top of the groove.

8. In radiation-counting apparatus having:
   (a) a shield forming a radiation-measurement chamber adapted to receive successive samples and having a sample-transport passage adapted for insertion and removal of samples and a source-transport passage adapted for insertion and removal of a standard source,
   (b) a sample-holder movable through the sample transport passage and having a sample-bearing portion positioning successive samples in the chamber, and
   (c) a standard source and means for selectively inserting and removing the standard source into and from a standard position in the chamber for standardizing measurements on samples,
the improved construction characterized by:
   (d) the inserting and removing means comprising an elongated straight shielding member reciprocable through the source-transport passage and bearing the source, the shielding member extending substantially forwardly of the source when withdrawn and providing attenuation at least equal to that of the shield,
   (e) the shield having a recess opposite the source-transport passage receiving the shielding member when the source is inserted in the standard position, and
   (f) an elongated straight drive member attached to the shielding member and the source at the outer end.

(References on following page)

References Cited

UNITED STATES PATENTS 3,163,756 12/1964 Meeder et al.
3,188,468 6/1965 Packard.
3,254,224 5/1966 Peterson.

RALPH G. NILSON, Primary Examiner
A. B. CROFT, Assistant Examiner

U.S. Cl. X.R.
250—71.5; 108